March 29, 1949.   J. A. JENSEN   2,465,727
PIPE CLOSURE AND FASTENING MEANS THEREFOR
Filed April 14, 1948   2 Sheets-Sheet 1
FIG_1_
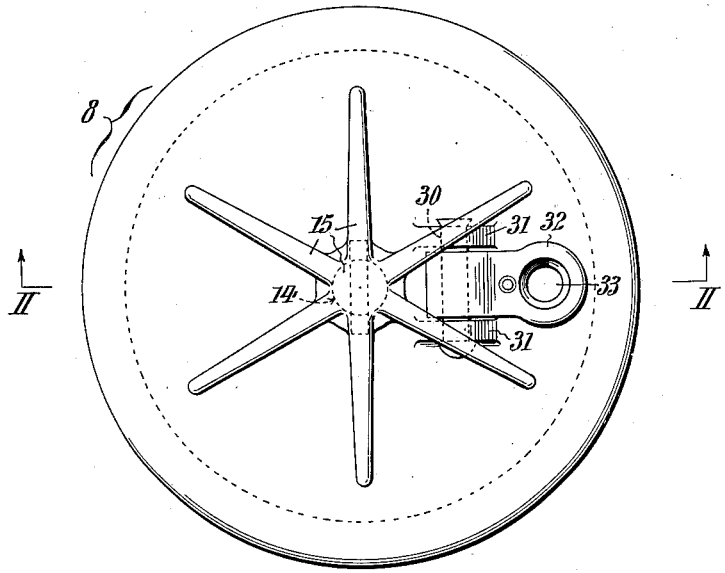
FIG_2_
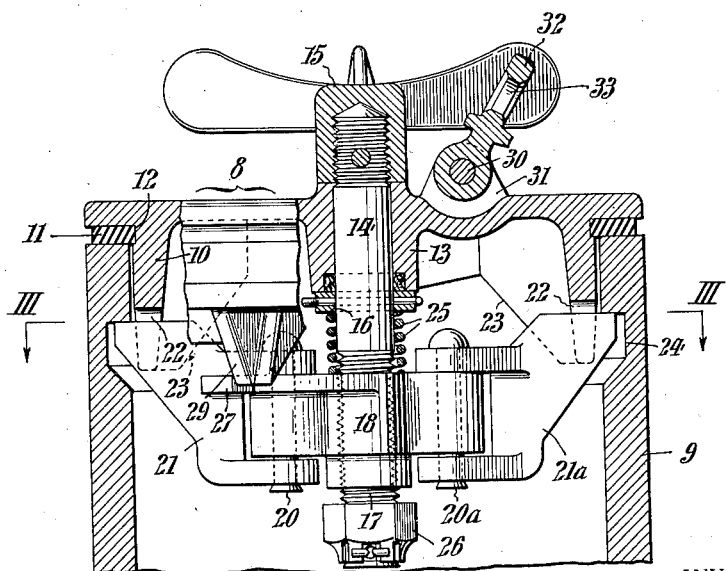
WITNESSES
A. J. Brittingham
Hubert Fuchs
INVENTOR:
James A. Jensen,
BY Paul & Paul
ATTORNEYS.

March 29, 1949.  J. A. JENSEN  2,465,727
PIPE CLOSURE AND FASTENING MEANS THEREFOR
Filed April 14, 1948  2 Sheets-Sheet 2
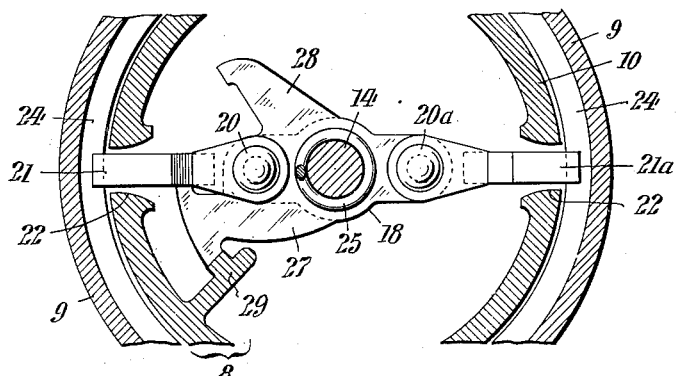
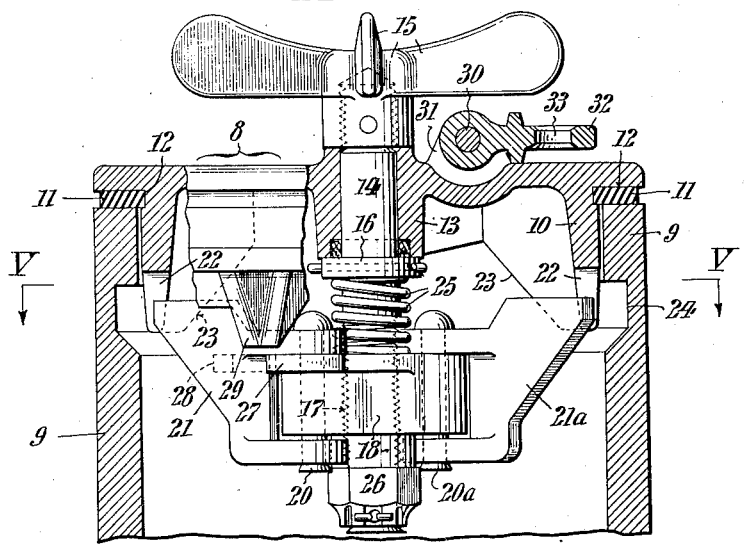
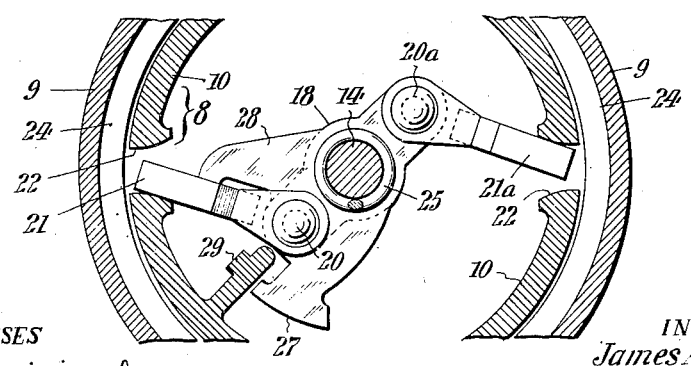
WITNESSES
A. J. Brittingham
Hubert Fuchs
INVENTOR:
James A. Jensen,
BY Paul & Paul
ATTORNEYS.

Patented Mar. 29, 1949

2,465,727

UNITED STATES PATENT OFFICE 2,465,727

PIPE CLOSURE AND FASTENING MEANS THEREFOR

James A. Jensen, Haverford, Pa., assignor to Philadelphia Valve Company, Philadelphia, Pa., a corporation of Pennsylvania Application April 14, 1948, Serial No. 20,910

6 Claims. (Cl. 220—25)

This invention relates to closures. More particularly, it is concerned with closures useful for example in connection with the fill pipes of storage tanks for fuel oil or the like either underground or within the cellars of residences or other buildings.

The chief aim of my invention is to provide closure of the kind referred to which can be relied upon for the maintenance of a fluid tight seal with the pipe end; which is secure against unauthorized removal; which is self contained and removable as a complete unit; and which is of rugged construction for capacity to withstand rough handling.

Other objects and attendant advantages will appear from the following detailed description of the attached drawings, wherein Fig. 1 is a view in top plan of a fill pipe closure conveniently embodying my invention.

Fig. 2, is an axial section taken as indicated by the angled arrows II—II in Fig. 1, with the closure in place and latched to the fill pipe.

Fig. 3, is a horizontal section taken as indicated by the angled arrows III—III in Fig. 2.

Figs. 4 and 5, are views corresponding to Figs. 2 and 3, with the closure unlatched in readiness for removal from the fill pipe.

As herein delineated, my improved closure comprises a cover element in the form of a circular cap 8 arranged for placement over the open top end of the fill pipe 9 and having a pendant annular flange 10 fitting, with a close working clearance, down into the pipe bore. A gasket 11 of compressible material having its inner edge lodged for retainment in an annular recess 12 of the flange 10, serves for the maintenance of a fluid-tight seal between the cap 8 and the pipe end. Rotative in an axial boss 13 of the cap 8 is an operating stem 14 to the upper protruding end of which a radially-armed manipulating grasp member or wheel 15 is pinned. A collar 16 abutting the lower face of the bearing boss 13 is relied upon to prevent axial movement of the stem 14, whereof the bottom end is provided with screw threads as at 17 and engaged by a swivel element 18. Swingable about vertical axis pivots 20 and 20a at diametrically opposite points on the swivel element 18 are latch members 21, 21a which pass through correspondingly disposed vertical notches 22 in downward lug extensions 23 of the cap flange 10, and of which the swinging ends normally engage beneath the square undercut shoulder of an annular recess 24 internally of the pipe immediately below the top of the latter. In compression between the bottom of the axis bearing boss 13 of the cap 8 and the element 18 and surrounding the medial portion of the stem 14 is a helical spring 25 the function of which will be explained presently, as will also the purpose of the stop head or nut 26 at the bottom end of said stem. As best seen in Figs. 3 and 5 the swivel element 18 is provided with a pair of angularly spaced fingers 27 and 28. The finger 27 normally engages between the latch member 21 and a pendant stop projection 29 of the cap 10 to prevent rotation of the swivel element 18 about the stem 14 and swinging of said latch member 21 and its mate 21a from the normal radial latching positions in which they are shown in Figs. 2 and 3.

Pivoted at 30 for up and down movement between upstanding ears 31 on the cap 8 is a keeper 32 with an eye 33 at its outer end for application of a pad lock or the like (not shown). When the pad lock is in place, the keeper 32 is caused to assume the angular position in which it is shown in Fig. 2 between two adjacent radial arms of the hand wheel 15 so that the stem 14 cannot be rotated until the pad lock is removed.

Operation

Upon removal of the pad lock from the keeper 32 and dropping of the latter out of the way of the hand wheel 15, release of the cap 8 is effected by turning the operating stem 14 counterclockwise in Fig. 1. As the stem 14 so is turned, the swivel element 18 will be moved downward while restrained against rotation as long as the finger 27 on said element is engaged between the latch member 21 and the stop projection 29 on the cap 8. In the continued rotation of the stem 14, the swivel element 18 will however be lowered to a level where the finger 27 will be depressed below the end of the stop projection 29 as in Fig. 4 whereupon, by the frictional action of the spring 25, said element will be caused to turn with the stem 14. As a consequence the latch members 21 and 21a will be swung about their pivots 20 and 20a and their outer ends concurrently withdrawn from beneath the shoulder of the internal annular recess 24 in the pipe 9 as shown in Fig. 5. This swinging movement of the latch members will be limited by ultimate engagement of the finger 28 with the latch member 21, and the downward movement of said nut element arrested when it encounters the stop head 26. With the latch members 21, 21a thus retracted, it will be seen that the cap 8 with its appurtenances can be withdrawn upwardly as a unit from the pipe end. Replacement of the cap is effected simply by reversing the steps of the above procedure, when, during the final turn of the stem 14, the gasket 11 will be compressed to form fluid-tight seal between the cup and the pipe end. After the replacement, the pad lock 35 is re-applied to secure the cap against unauthorized removal.

Having thus described my invention, I claim:

1. A closure for a fill pipe or the like comprising a cap for placement over the pipe end; an operating stem constrained to rotation in a bearing on the cap; a swivel element threadedly engaged upon the lower end of the stem above a stop at the terminus of said end; a plurality of radially-arranged latch members connected by vertical axis pivots to the swivel element, with their outer ends slidable longitudinally in guides on the cap and normally engaged beneath an annular shoulder within the pipe; and check means to prevent pivoting of the latch members until the swivel element contacts the stop head on the stem as the latter is turned in a direction to release the cap.

2. A closure according to claim 1, further including spring means in compression between the cap and the swivel element.

3. A closure according to claim 1, wherein the cap is provided with a pendent circumferential flange to fit down into the pipe; and wherein vertical slots in said flange constitute the guides for the outer ends of the latch members.

4. A closure according to claim 1, wherein the check means includes a fixed pendent abutment projection on the cap, and a lateral finger on the swivel element normally engaged between said stop and a side of one of the latch members.

5. A closure according to claim 1, wherein the check means includes a fixed pendent abutment projection on the cap, and a lateral finger on the swivel element, for engagement normally between said stop and one side of one of the latch members; and further including a second lateral finger on the swivel element angularly spaced from the first and adapted, by engagement with the opposite face of the aforesaid one of the latch members, to limit the swivelling movement of the swivel element incident to release of the cap.

6. A closure according to claim 1, wherein the operating stem is provided at its outer end with a radially-armed manipulating grasp; and further including a keeper with an eye for application thereto of a padlock, said keeper being pivotally connected to the top of the cap so as to be swingable upwardly from an out of the way position between adjacent radial arms of the grasp and so held upon application of the padlock to prevent unauthorized removal of the cap.

JAMES A. JENSEN.

No references cited.